M. ARMSTRONG.
CANDY CUTTING MACHINE.
APPLICATION FILED SEPT. 15, 1911.
1,013,634.
Patented Jan. 2, 1912.
2 SHEETS—SHEET 2.
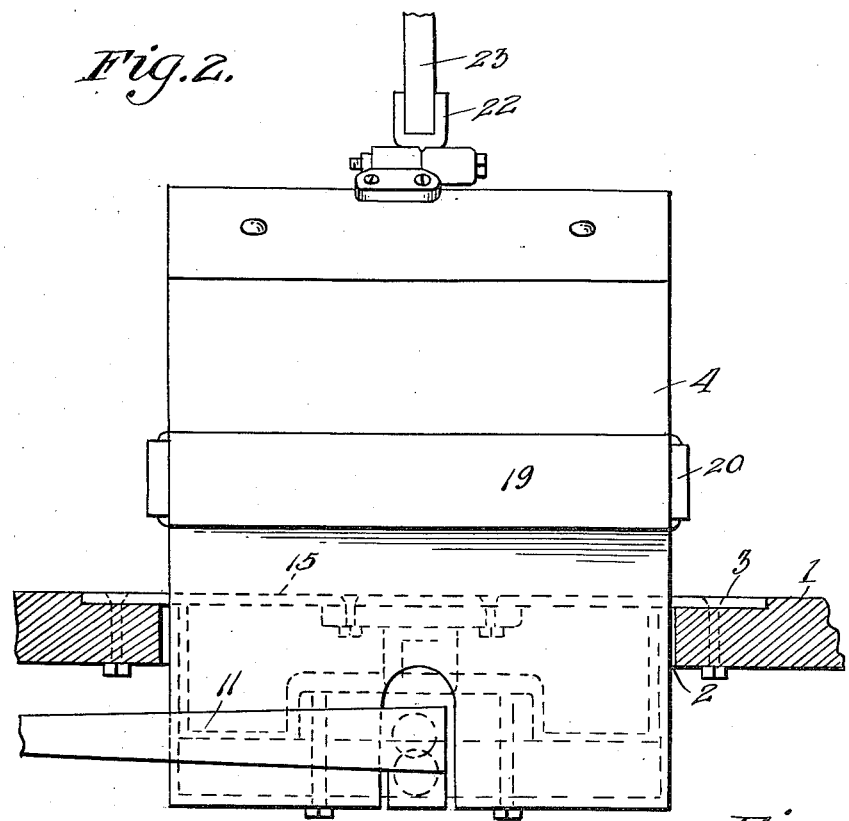
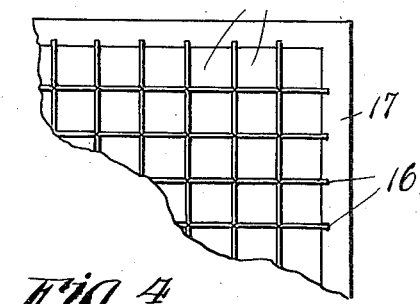
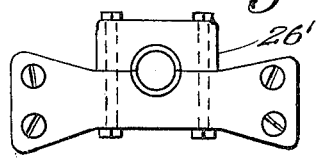
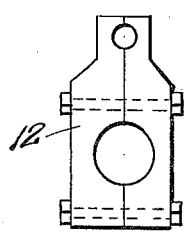
WITNESSES
INVENTOR
Marcellus Armstrong
By
Attorney

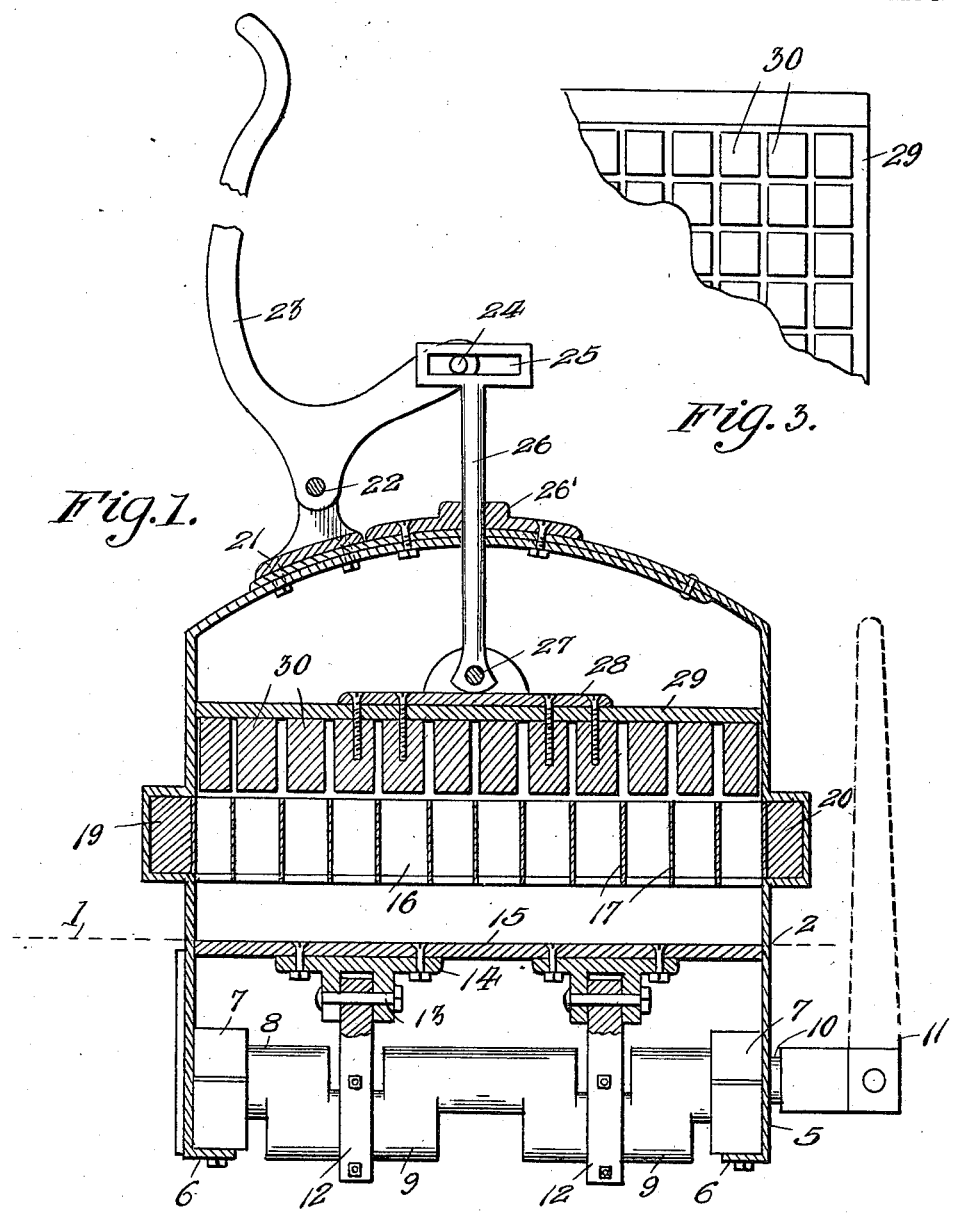

UNITED STATES PATENT OFFICE.

MARCELLUS ARMSTRONG, OF CORVALLIS, OREGON.

CANDY-CUTTING MACHINE.

1,013,634. Specification of Letters Patent. Patented Jan. 2, 1912.

Application filed September 15, 1911. Serial No. 649,542.

*To all whom it may concern:*

Be it known that I, MARCELLUS ARMSTRONG, a citizen of the United States, residing at Corvallis, in the county of Benton and State of Oregon, have invented certain new and useful Improvements in Candy-Cutting Machines, of which the following is a specification.

My invention relates to improvements in candy cutting machines such as required for cutting caramels or candy into blocks or cubes, and the object of my invention is the provision of a machine which will have a large capacity; which will insure the rapid cutting of the candy into blocks or caramels of the same size and shape and which will embody few parts, insuring simplicity, durability and inexpensiveness of production.

To attain the desired objects my invention consists of a candy cutting machine embodying novel features of construction and combination of parts substantially as disclosed herein.

Figure 1 represents a transverse sectional view of my complete machine. Fig. 2 represents an end elevation of the machine. Fig. 3 represents a face or plan view of a portion of the candy ejector and plunger. Fig. 4 represents a plan or face view of part of the cutting frame, and Figs. 5 and 6 represent detail views of the bearings for the ends and cranks of the crank-shaft.

Referring by numeral to the drawings in which similar characters denote corresponding parts: the numeral 1 designates a table or platform having an opening 2 in which fits and is secured at 3, my candy cutting machine.

The machine employs a casing 4, of rectangular form having its lower portion 5 open and formed with flanges 6, upon which are mounted and secured the two part bearing boxes 7, in which bear the ends of the shaft 8, formed with a pair of cranks 9, and having the extended end 10, to which is connected an operating handle or lever 11. Upon the cranks 9 is secured the arms 12, whose upper ends are connected to the pins 13, secured to the brackets 14, depending from the underface of the plunger or follower 15, which comprises a flat plate or platen.

Within the casing and above the plunger is secured the knife or cutting frame composed of the outer border 16, and the strips 17, arranged to form the series of pockets 18, and the frame has the side portions 19, which fit in the channels 20 of the casing and hold the frame in proper place.

Upon the top or dome of the casing is a bracket 21, to which is fulcrumed at 22, the lever 23, having a grasping portion at one end and at its other end a stud or pin 24. This stud 24 fits in the slotted head 25, on the upper end of the rod 26, which passes vertically through the guide member 26' secured to the top of the casing and has its lower end secured at 27 to the bracket 28 secured to the plate 29, which carries the series of ejector blocks 30, which are adapted to enter the pockets of the knife frame and eject the blocks of candy from the knife frame.

The operation of my machine will be readily understood from the foregoing description taken in connection with the drawings and it will be apparent that the candy batch or material is placed in the casing upon the plunger, forced up against the knife frame, and by the frame cut and formed into blocks and caramels. The plunger after forcing the batch into the cutting frame is returned to original position and the ejector is lowered, bringing the blocks into the pockets of the frame and forcing or expelling the finished blocks or caramels down upon the plunger from which they are removed and the operation repeated.

It will be seen that the machine is very easily operated and will form and deliver the blocks or caramels in a rapid and perfect manner and prove a great time, money and labor saver.

I claim:

1. In a machine of the class described, the combination with a support, of a candy cutting machine fitting in and secured thereto, said machine comprising a rectangular flanged casing, two-part bearing boxes upon the flanges of the casing, a cranked shaft journaled in the bearing boxes and having an extended end, an operating lever connected to the extended end, arms secured to the cranks of the shaft, a plunger mounted in the casing, brackets depending therefrom, transverse pins fitting in said brackets to secure the arms to the plunger, a knife frame arranged in the casing above the plunger and having a plurality of substantially rectangular pockets, means carried by the frame for securing the frame to the casing, a bracket formed upon the dome of the casing, a lever fulcrumed therein, a stud at one end of the lever, and means connected to said stud for ejecting the batch of candy from the pockets.

2. In a machine of the class described, the combination with a support, of a candy cutting machine fitting in and secured thereto, said machine comprising a rectangular flanged casing, two-part bearing boxes upon the flanges of the casing, a cranked shaft journaled in the bearing boxes and having an extended end, an operating lever connected to the extended end, arms secured to the cranks of the shaft, a plunger mounted in the casing, brackets depending therefrom, transverse pins fitting in said brackets to secure the arms to the plunger, a knife frame arranged in said casing above the plunger and having a plurality of substantially rectangular pockets, means carried by the frame for securing the frame in position within the casing, a bracket formed upon the dome of the casing, a vertical rod passing therethrough, a slotted head formed on the upper end of the rod in which said stud fits, an ejector plate arranged within the casing provided with a bracket to which is secured the lower end of the rod, and a series of blocks carried by the ejector plate adapted to enter the pockets of the plunger upon the lowering of said plate.

In testimony whereof I affix my signature in presence of two witnesses.

MARCELLUS ARMSTRONG.

Witnesses:
JOSEPH H. DAWSON,
GEO. W. DENMAN.

---

Copies of this patent may be obtained for five cents each, by addressing the "Commissioner of Patents, Washington, D. C."